June 30, 1970   J. P. PAWLETKO   3,518,516
STEPPING MOTOR CONSTANT VELOCITY DRIVE
Filed Dec. 26, 1967   3 Sheets-Sheet 1

INVENTOR
JOSEPH P. PAWLETKO
BY Francis V. Giolma
ATTORNEY

United States Patent Office 3,518,516
Patented June 30, 1970

1

3,518,516
STEPPING MOTOR CONSTANT VELOCITY DRIVE
Joseph P. Pawletko, Endwell, N.Y., assignor to International Business Machines Corporation, Armonk, N.Y., a corporation of New York
Filed Dec. 26, 1967, Ser. No. 693,366
Int. Cl. H02p 1/52
U.S. Cl. 318—138                                       10 Claims

ABSTRACT OF THE DISCLOSURE

A stepping motor is brought up to speed by a closed loop feedback control system, and is automatically switched to an open loop oscillator control system when it reaches speed.

FIELD OF THE INVENTION

The invention relates to a constant velocity drive for a stepping motor.

DESCRIPTION OF THE PRIOR ART

Stepping motor control circuits are known wherein either closed loop feedback control is used, or an open loop oscillator control is used to start and run a stepping motor.

SUMMARY OF THE INVENTION

Generally stated, it is an object of this invention to provide a simple and efficient constant velocity drive for a stepping motor.

More specifically, it is an object of this invention to provide for starting a stepping motor with a closed loop feedback control circuit, and for transferring it to an open loop oscillator controlled circuit when it reaches speed.

Another object of this invention is to provide a stepping motor control circuit having the constant speed characteristics of an open loop oscillator controlled circuit, and the advantages of a closed feedback loop control circuit while accelerating.

It is also an object of this invention to provide for using a phase locked oscillator, which can be reset to the correct phase relation, for driving a stepping motor, which is brought up to speed by feedback pulses.

Yet another object of the invention is to provide for starting a stepping motor on a closed loop feedback circuit, resetting a free-running oscillator with feedback pulses while the motor is accelerating, and switching the motor to oscillator control when the period of the feedback pulses equals the period of the oscillator.

Another important object of this invention is to provide in a stepping motor control circuit for using feedback pulses from a stepping motor emitter, for accelerating the stepping motor and resetting a free-running oscillator to synchronize the oscillator with the feedback pulses, and when the motor is up to speed, transferring the control from the feedback pulses to the oscillator pulses.

In a preferred embodiment of the invention, a stepping motor is started by a start pulse, and feedback pulses from an emitter driven by the motor are gated by the output of an Up to Speed latch to accelerate the motor. At the same time, the feedback pulses are gated to reset and synchronize a free-running oscillator. Feedback and oscillator pulses are applied to a pair of latches for resetting the Up to Speed latch when the motor is up to speed. This drops the feedback pulse gate and enables the oscillator pulse gate drive. At the same time, a discriminator is enabled, which compares the phase of the oscillator and feedback pulses, and corrects the relation therebetween by modifying the oscillator phase. A stop signal blocks the normal drive pulses, and times a stopping sequence of a predetermined train of stopping pulses to bring the stepping motor to rest.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
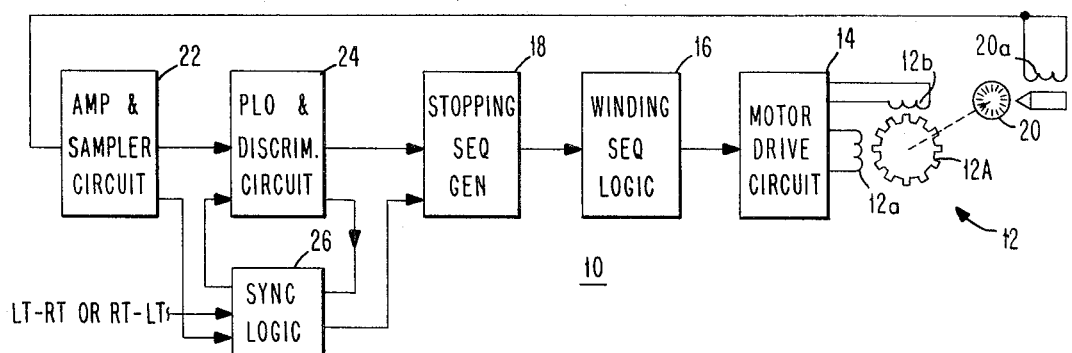
FIG. 1 is a schematic block diagram of a stepping motor control system embodying the invention in one of its forms.

Referring to FIG. 1 of the drawings, the reference numeral 10 denotes generally a stepping motor control system for a stepping motor 12 having phase related windings 12a and 12b for effecting rotation of multi-toothed armature 12A in a step-by-step sequence in response to a LT–RT or RT–LT initiating signal for driving a movable element such as a type bar (not shown) or the like. The stepping motor 12 may be of any suitable type, being for example, of the type described in the article entitled "Characteristics of a Synchronous Inductor Motor" by Arthur E. Snowdon and Elmer W. Madson, published in "Applications and Industry" March 1962, being the subject of paper 61–650 recommended by the AIEE Industrial Control Committe, and approved by the AIEE Technical Operations Department for presentation at the AIEE Northeastern District Meeting, Hartford, Conn., May 17–19, 1961.

As shown, the windings 12a and 12b of the motor are energized from a Motor Drive Circuit 14 of a suitable type, which may be energized through Winding Sequence Logic 16 comprising a well-known arrangement of binary triggers. A Stopping Sequence Generator 18 is connected to the Winding Sequence Logic 16 to assure the best deceleration and critically damped stopping necessary for good performance of the motor. Operation of the motor is effected generally during acceleration by means of feedback pulses from an emitter 20, driven by the motor, and an associated emitter read head 20a, which is connected to an Amplifier and Sampler Circuit 22, connected to the motor drive circuits 14 through the Stopping Sequence Generator 18 and Winding Sequence Logic 16. A Phase Locked Oscillator and Discriminator Circuit 24 is provided for operation under control of the feedback pulses from the emitter 20, and under the control of Synchronizing Logic 26, for operating the motor 12 when it has come up to speed.

Figure 2:
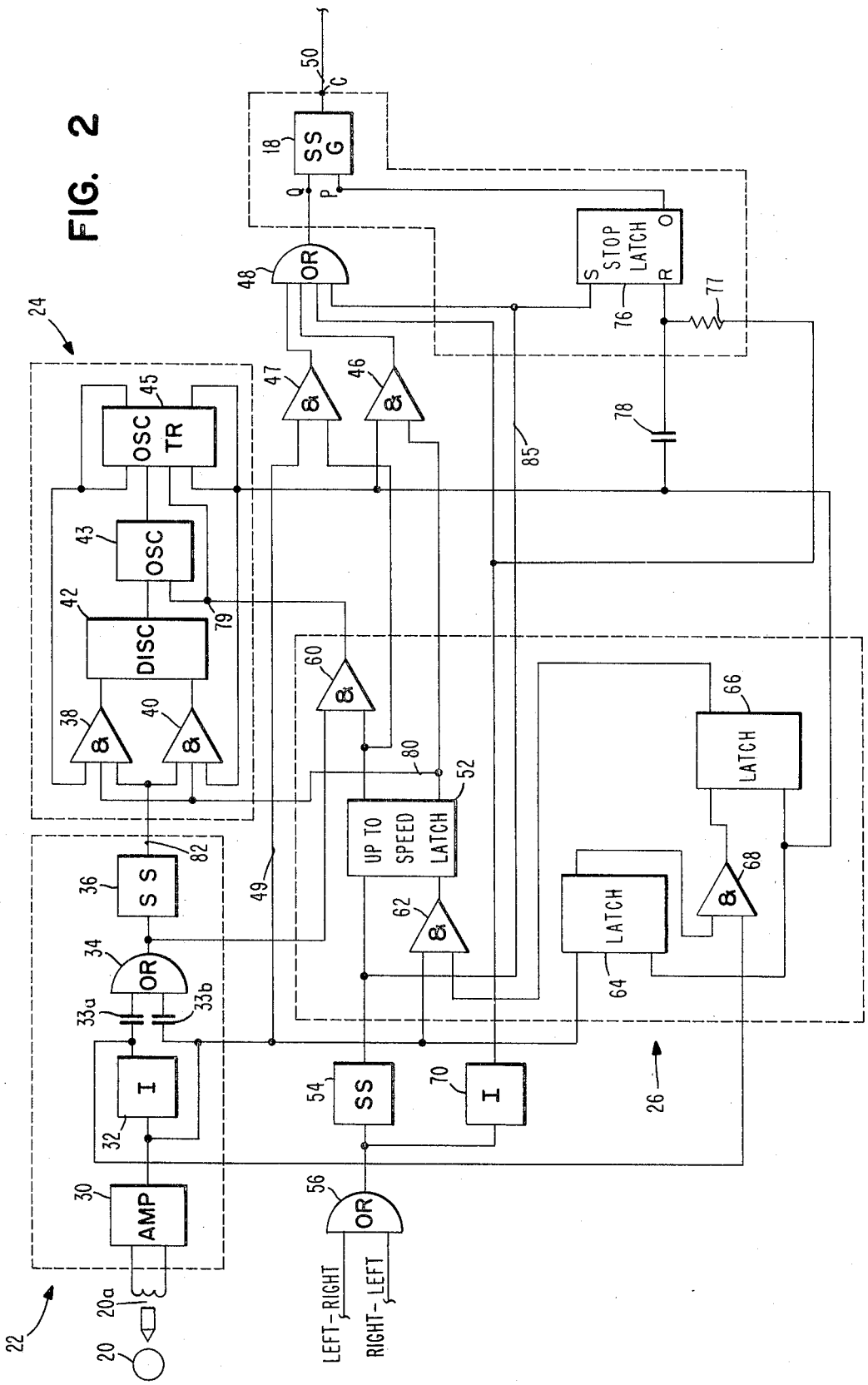
FIG. 2 is a schematic circuit diagram in greater detail of the stepping motor control system shown in FIG. 1.

Referring to FIG. 2, which shows more details of the logic circuitry of the system of FIG. 1, it will be seen that the Amplifier and Sampler Circuit 22 comprises an Amplifier 30 which is connected through an Inverter 32 and Capacitors 33a and 33b to an OR 34, which in turn connected to a Single Shot 36. The Single Shot 36 has an interval on the order of ⅔ of the Oscillator frequency, and provides one input to a pair of AND's 38 and 40 which selectively control a Discriminator 42 to vary the phase relation of an Oscillator 43 forming a part of the Phase Locked Oscillator and Discriminator Circuit 24 of FIG. 1. The Oscillator 43 drives a binary trigger 45, the OFF output of which is applied to AND 46 for energizing through OR 48, the Stopping Sequence Generator 18 and the Winding Sequence Logic 16 and Motor Drive 14, the Windings 12a and 12b of the motor 12, over conductor 50. The On output of the binary trigger 45 is connected through AND 38 to provide one control for the Discriminator 42, the other control coming from the OFF output of the binary trigger 45 through AND 40.

Figure 5:
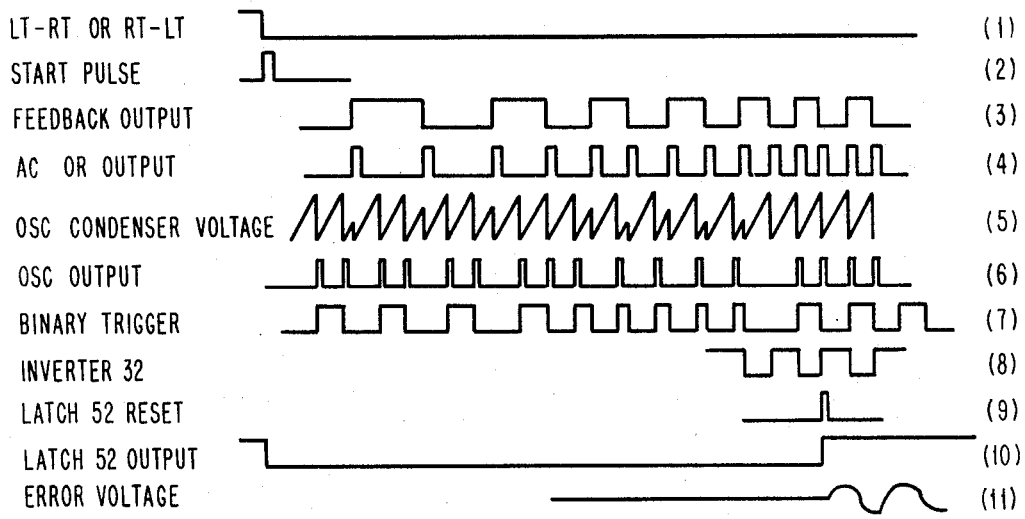
FIG. 5 shows a plurality of timing curves illustrating operation of the stepping motor circuit shown in FIGS. 1 and 2.

Feedback pulses from the emitter 20 and the Amplifier 30 are applied over conductor 49 through AND 47, OR 48 and the Stopping Sequence Generator 18, to the conductor 50, for controlling acceleration of the motor 12 during its accelerating period. These feedback pulses are gated in AND 47 by the On output of an Up to Speed latch 52 which is set from a Single Shot 54 in response to a Left-Right or Right-Left signal applied to the inputs of OR 56, from suitable limit switches or the like operated by a movable type bar, for example. Single Shot 54 assists in blocking extraneous noise during starting. During acceleration of the motor 12, feedback pulses from the OR 34 are gated by the On output of the Up to Speed latch 52 at AND 60, and are used to reset the Oscillator 43 to maintain it in synchronization with the feedback pulses, as shown by curve (5) of FIG. 5.

Transfer of the operation of the motor 12 from feedback pulses to oscillator pulses is controlled by resetting the Up to Speed latch 52 through AND 62. This is effected as shown by curves (6–10) of FIG. 5 when the motor comes up to speed, by means of a pair of latches 64 and 66, latch 64 being set by a feedback pulse and reset by the Off output of the oscillator trigger 45. Latch 66 is also reset by the Off output of the oscillator trigger 45, and is set by the On output of the latch 64 through AND 68 together with the output of Inverter 32. When the latch 66 is set by one feedback pulse, and is not reset by an oscillator pulse from the oscillator trigger 45 before the next feedback pulse occurs, this indicates that the motor is up to speed and the Up to Speed latch 52 will be reset through AND 62, rendering AND's 60 and 47 ineffective, and enabling the AND's 38 and 40 for effecting control of the Discriminator 42 to control of the oscillator pulses for driving the motor.

Stopping of the motor is effected with termination of the LT–RT or RT–LT input signal to the OR 56, which produces an up level output from Inverter 70, and blocks the output of the OR 48, thus terminating the normal feedback pulses. Simultaneously with blocking of the output of OR 48 to the Stopping Sequence Generator 18, a Stop latch 76 is reset through capacitor 78 by the next oscillator pulse, gated by the termination of the negative output from OR 56 through the Harper gate including resistor 77, and initiates a stopping sequence of a predetermined number of stopping pulses by applying the Off output to the Stopping Sequence Generator 18 at terminal P.

Figure 3:
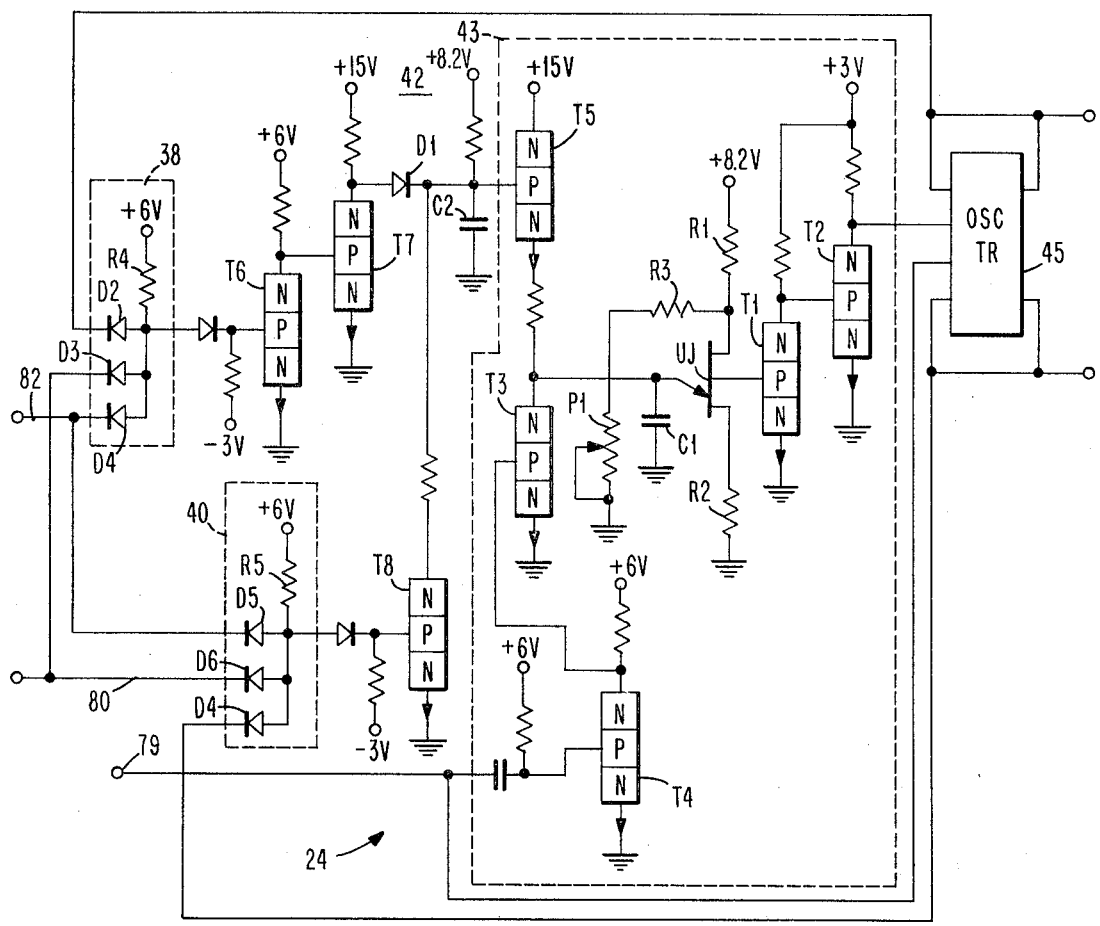
FIG. 3 is a circuit diagram of the Discriminator and Oscillator Circuits shown in FIG. 2.

Referring to FIG. 3, it will be seen that the Oscillator 43 may, for example, comprise a unijunction transistor oscillator including a unijunction transistor UJ connected from the positive terminal of an 8.2 regulated voltage source through resistors R1 and R2 to ground, and having a capacitor C1 connected between the emitter and ground, the output of the oscillator being applied through transistors T1 and T2 to the binary trigger 45. Reset of the oscillator is effected from Reset terminal 79, which is also connected to reset the trigger 45, through control transistors T3 and T4, which provide a shunt discharge circuit to connect the capacitor C1 to ground. Potentiometer P1 and resistor R1 provide for frequency adjustment of the oscillator.

Control of the oscillator 43 is effected through transistor T5 by applying to the oscillator a voltage from the discriminator 42 comprising a capacitor C2 connected for charging through diode D1 under the control of transistors T6 and T7 in response to the output of AND 38, which comprises a load resistor R4 and diodes D2–D4. AND 40 comprising load resistor R5 and diodes D5–D7 is connected to control transistor T8 for discharging the capacitor C2. The controlling inputs to AND's 38 and 40 are from the Up to Speed latch 52 over conductor 80 and from the Single Shot 36 over conductor 82 so that the oscillator and feedback pulses are sampled while the latch 52 is reset, during the output of SS36.

Figure 4:
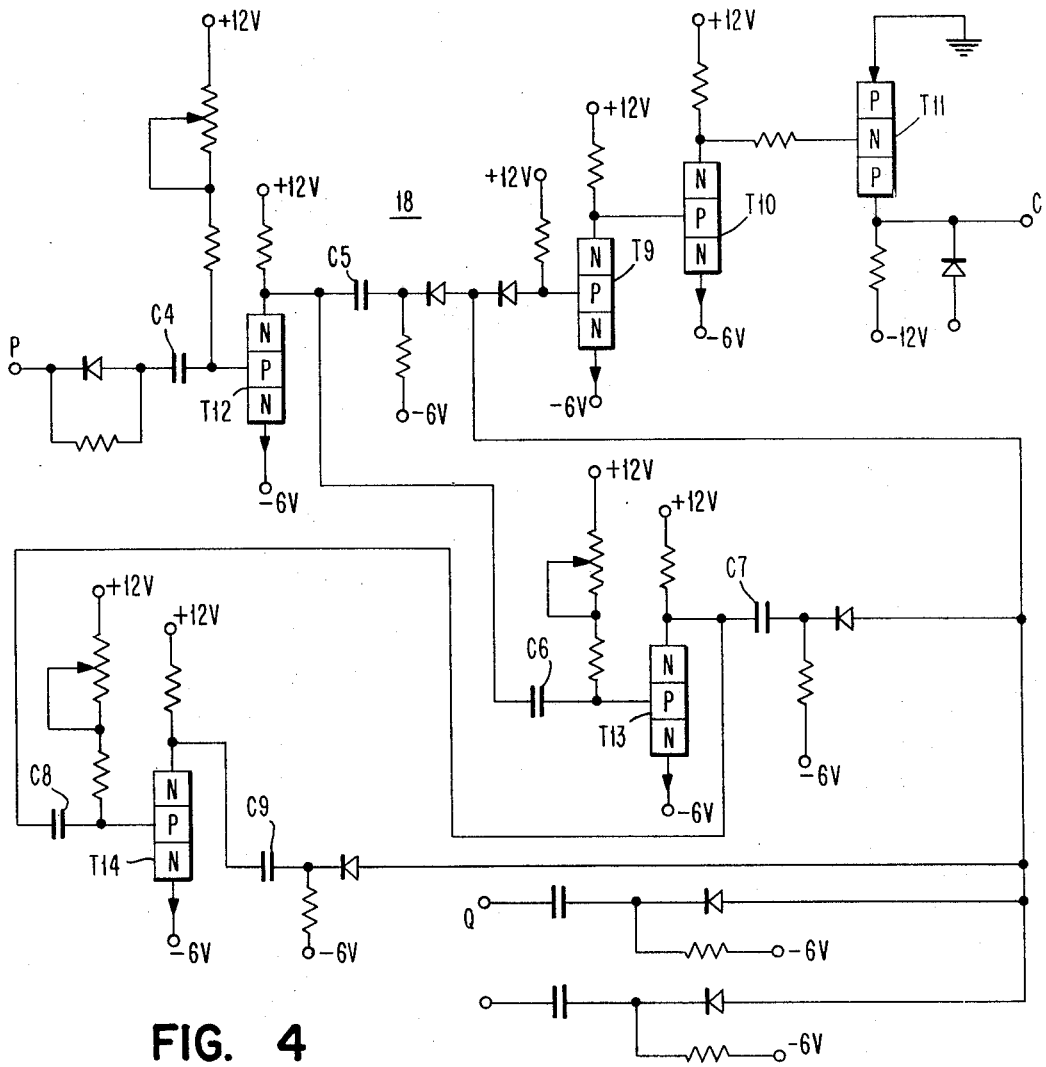
FIG. 4 is a circuit diagram of the Stopping Sequence Generator shown in FIGS. 1 and 2.

Referring to FIG. 4, it will be seen that the Stopping Sequence Generator 18 may comprise a cascade arrangement of transistors T9, T10, and T11 for producing drive pulses at terminal C in response to the application of input signal pulses at the terminal Q. A negative level signal applied to the input terminal P produces through capacitors C4–C5, C6–C7, C8–C9 and transistors T12, T13 and T14 respectively, a series of definitely spaced stopping pulses at the terminal C for stopping the motor.

An initial start signal is provided by changing of the left to right (LT–RT) or right to left (RT–LT) gates, which provides an output at OR 56. This initiates a Single Shot 54 to provide a start signal as shown by curve (2) FIG. 5 over conductor 85 through OR 48 and the Stopping Sequence Generator 18 to produce a pulse for starting operation of the motor 12. This pulse also sets the Up to Speed latch 52 on, so that the Off output of the latch 52 de-activates the Discriminator 42 by removing its output from AND's 38 and 40. Removal of the On output of the Up to Speed latch 52 from AND 46 blocks the oscillator pulses from coming through OR 48, while the On output allows the feedback pulses from OR 34 to reset the oscillator 43 through AND 60, at the same time resetting the binary trigger 45 also. The period of single shot 54 is sufficiently long to block any extraneous pulses during the motor start time.

Motor motion initiated by the start pulse generates a feedback pulse signal through the emitter transducer 20a. The signal from the amplifier 30 is then past through an AC OR 34, which results in an output for every single signal transition. This output is used to initiate a single shot output from the Single Shot 36, and also resets the Oscillator 43. Feedback pulses from the Amplifier 30 are also applied through AND 47 and OR 48 and the Stopping Sequence Generator 18 to energize the motor windings for effecting stepping of the motor.

The Up to Speed latch 52 is reset with a feedback pulse when its interval is shorter than the oscillator period. Resetting of the Up to Speed latch 52 presents further resetting of the Oscillator 43, and prevents feedback pulses from arriving at the output by blocking the AND's 60 and 47. Sensing of the Up to Speed interval is obtained by means of latches 64 and 66. The inverted feedback signal from Inverter 32 is used to set the latch 66, which is reset by the output of the Oscillator over conductor 86. Latch 64 is reset by the Oscillator. Latch 64 being on, allows latch 66 to come on, providing it was not reset by the Oscillator previously. Coincidence of feedback pulses with latch 66 being on, resets the Up to Speed latch 52, and transfers the control of the stepping motor from the feedback pulses to the oscillator output.

Feedback pulses from the feedback transducer 20a are fed to the Single Shot 36 through OR 34. The output of Single Shot 36 is applied to AND's 38 and 40 which in turn feed the Discriminator 42. The Single Shot 36 determines the sampling period of the Discriminator, which in turn determines the magnitude of the stored error voltage in the sample and hold circuits of the Discriminator. This controls the oscillator phase relations. Since the oscillator is running at two times the slewing rate, a correction per half cycle can be made by comparing the phase relationship of the Oscillator to that of the feedback signal. The Oscillator 43 being a voltage controlled oscillator is ready controllable as to phase relation and readily reset for synchronizing purposes.

When the LT–RT or RT–LT signal which initiated the starting sequence terminates, the inverter 70 produces an up level, which blocks the OR 48 and inhibits the application of further feedback pulses to SSG18. The up level from inverter 70 acts through resistor 77 as a Harper gate to permit the next pulse from the trigger 45 to reset the Stop Latch 76 through capacitor 78. The Off output of latch 76 applied to terminal P of the Stopping Sequence Generator 18 produces a train of three Stop pulses at predetermined intervals to stop the motor.

From the above description and the accompanying drawings, it will be apparent that the present invention provides a simple and effective stepping motor drive for accelerating a stepping motor and then maintaining it accurately at a substantially constant speed by varying the phase relation of the oscillator. By utilizing closed loop feedback control during acceleration and open loop feedback control during acceleration and open loop oscillator control when the motor has come up to speed, the best features of both types of circuits may be obtained.

While the invention has been particularly shown and described with reference to a preferred embodiment thereof, it will be understood by those skilled in the art that various changes in form and details may be made therein without departing from the spirit and scope of the invention.

What is claimed is:

1. In a control system for a stepping motor having a multi-toothed rotor and a stator with a plurality of phase related windings connected to switching means operable to sequentially effect energization of the windings, and cause the rotor to advance one step at a time in response to successive pulses applied to the switching means, feedback means including an emitter driven by the motor operable to produce feedback pulses in response to step advances of the motor, a free-running oscillator, and means connected to said oscillator and said feedback means including switch means selectively operable in response to the phase relation of pulses from said feedback means and said oscillator to connect the feedback means or the oscillator to apply pulses therefrom to the switching means to operate the stepping motor during acceleration and when the motor is up to speed, respectively.

2. A control system for a stepping motor as defined in claim 1, characterized by said switch means comprising gate means connected to be selectively operable to furnish pulses from either the feedback means or the oscillator to operate the switching means.

3. A control system for a stepping motor as defined in claim 2, characterized by an Up to Speed latch which is connected to said oscillator and feedback means to provide a gating signal for feedback pulses when set by a start signal, and provides a gating signal for the oscillator pulses when reset upon the motor attaining running speed.

4. A control system for a stepping motor as defined in claim 3, characterized by the Up to Speed latch being connected to gate feedback pulses to reset the oscillator during acceleration of the motor.

5. A control system for a stepping motor as defined in claim 3, characterized by the Up to Speed latch being reset by a feedback pulse gated by the output from a latch which is set when a second feedback pulse occurs before an intervening oscillator pulse resets a control latch associated therewith.

6. A control system for a stepping motor as defined in claim 5, characterized by a discriminator connected to respond to feedback and oscillator pulses gated by the Up to Speed latch when reset, for controlling the phase relation of the oscillator and feedback pulses.

7. A control system for a stepping motor as defined in claim 6, characterized by the oscillator being a phase locked unijunction oscillator with the discriminator output connected to vary the emitter voltage thereof.

8. A control circuit for a stepping motor as defined in claim 7, characterized by a single shot having a timing interval on the order of two thirds the oscillator interval connected to gate the discriminator inputs and determine the discriminator sampling period.

9. A control system for a stepping motor as defined in claim 8, characterized by a single shot connected to provide a timed start pulse to set the Up to Speed latch in response to an initiating signal.

10. A control system for a stepping motor as defined in claim 9, characterized by means for differentiating both the leading and trailing edges of the feedback signal and means including an AC OR for connecting the feedback signals to control the discriminator sampling single shot and reset the Up to Speed latch.

References Cited
UNITED STATES PATENTS

| | | | |
|---|---|---|---|
| 2,814,769 | 11/1957 | Williams | 318—138 XR |
| 3,242,406 | 3/1966 | Tanka | 318—138 XR |
| 3,302,083 | 1/1967 | Tanka et al. | 318—138 |
| 3,319,104 | 5/1967 | Yasuoka et al. | 318—138 |

GLEN R. SIMMONS, Primary Examiner

U.S. Cl. X.R.

318—396, 415